(12) United States Patent
Dhar et al.

(10) Patent No.: US 7,555,459 B2
(45) Date of Patent: *Jun. 30, 2009

(54) AUTOMATED LOAN PROCESSING SYSTEM AND METHOD

(75) Inventors: Kuldeep K. Dhar, Plymouth, MN (US); James Ahles, Wade Park, MN (US); Anupa Dhar, Plymouth, MN (US)

(73) Assignee: International Projects Consultancy Services, Inc., Minneapolis, MN (US)

( * ) Notice: Subject to any disclaimer, the term of this patent is extended or adjusted under 35 U.S.C. 154(b) by 1383 days.

This patent is subject to a terminal disclaimer.

(21) Appl. No.: 09/970,276

(22) Filed: Oct. 2, 2001

(65) Prior Publication Data

US 2002/0040339 A1  Apr. 4, 2002

Related U.S. Application Data

(60) Provisional application No. 60/237,164, filed on Oct. 2, 2000.

(51) Int. Cl.
G06Q 40/00  (2006.01)

(52) U.S. Cl. ........................................................ 705/38
(58) Field of Classification Search ................... 705/35, 705/38, 39
See application file for complete search history.

(56) References Cited

U.S. PATENT DOCUMENTS

| | | | |
|---|---|---|---|
| 5,206,934 A | | 4/1993 | Naef, III |
| 5,745,901 A | | 4/1998 | Entner et al. |
| 5,826,239 A | | 10/1998 | Du et al. |
| 5,848,393 A | * | 12/1998 | Goodridge et al. .............. 705/8 |
| 5,878,403 A | * | 3/1999 | DeFrancesco et al. ......... 705/38 |
| 5,930,776 A | | 7/1999 | Dykstra et al. |
| 5,940,811 A | * | 8/1999 | Norris .......................... 705/38 |
| 5,940,812 A | * | 8/1999 | Tengel et al. .................. 705/38 |
| 5,987,434 A | | 11/1999 | Libman |
| 5,995,947 A | * | 11/1999 | Fraser et al. .................. 705/38 |

(Continued)

FOREIGN PATENT DOCUMENTS

| EP | 0 840 244 A1 | 5/1998 |
|---|---|---|
| WO | WO 99/59084 | 11/1999 |

OTHER PUBLICATIONS

Citi bank website (www. citibank.com) dated Mar. 1, 2000; finding branch offices location all over the world.*

(Continued)

Primary Examiner—Hani Kazimi
Assistant Examiner—Bijendra K Shrestha
(74) Attorney, Agent, or Firm—Kinney & Lange, P.A.

(57) ABSTRACT

A workflow engine for rendering instant credit decisions includes a workflow designer, a web site interface, a database, checklists created by the workflow designer and associated with at least one loan offering, and a messaging system for brokering messages between a consumer and a lender. The workflow engine accepts web-based loan applications, processes the loan applications programmatically, and renders a loan decision within seconds. The workflow engine uses checklists to evaluate loan applications. Each checklist is associated with one loan offering and one lender. Multiple lenders offer multiple loan offerings through the system to compete for consumer/borrowers. The system evaluates loan applications and renders a programmatic loan decision without human intervention, subject to verification of the application data.

14 Claims, 10 Drawing Sheets

U.S. PATENT DOCUMENTS

| | | | |
|---|---|---|---|
| 5,999,911 A | 12/1999 | Berg et al. | |
| 6,003,011 A | 12/1999 | Sarin et al. | |
| 6,006,193 A | 12/1999 | Gibson et al. | 705/8 |
| 6,014,645 A * | 1/2000 | Cunningham | 705/38 |
| 6,041,306 A | 3/2000 | Du et al. | |
| 6,067,548 A | 5/2000 | Cheng | |
| 6,115,646 A | 9/2000 | Fiszman et al. | |
| 6,119,149 A | 9/2000 | Notani | |
| 6,122,633 A | 9/2000 | Leymann et al. | 707/10 |
| 6,233,566 B1 | 5/2001 | Levine et al. | 705/37 |
| 6,327,362 B1 * | 12/2001 | Hull et al. | 379/243 |
| 6,385,594 B1 * | 5/2002 | Lebda et al. | 705/38 |
| 6,430,538 B1 | 8/2002 | Bacon et al. | |
| 6,438,526 B1 * | 8/2002 | Dykes et al. | 705/38 |
| 6,505,176 B2 * | 1/2003 | DeFrancesco et al. | 705/38 |
| 6,823,319 B1 * | 11/2004 | Lynch et al. | 705/38 |
| 6,904,412 B1 * | 6/2005 | Broadbent et al. | 705/38 |
| 6,993,514 B2 * | 1/2006 | Majoor | 706/47 |
| 2001/0014877 A1 * | 8/2001 | DeFrancesco et al. | 705/38 |
| 2001/0029482 A1 * | 10/2001 | Tealdi et al. | 705/38 |
| 2001/0037288 A1 * | 11/2001 | Bennett et al. | 705/38 |
| 2002/0007341 A1 | 1/2002 | Lent et al. | 705/38 |
| 2002/0040312 A1 * | 4/2002 | Dhar et al. | 705/8 |
| 2002/0052835 A1 | 5/2002 | Toscano | 705/38 |
| 2002/0059137 A1 * | 5/2002 | Freeman et al. | 705/38 |

OTHER PUBLICATIONS

Miller, J., et al., "WebWork: Meteor$_2$'s Web-Based Workflow Management System", from *Journal of Intelligent Information Systems*, vol. 10, No. 2, pp. 185-215, Mar. 1998.

Mehandjiev, N., et al., "User-Enhanceability for Organisational Information Systems through Visual Programming," from *Advanced Information Systems Engineering 8$^{th}$ Int'l. Conference*, 1996, pp. 432-456.

* cited by examiner

AUTOMATED LOAN PROCESSING SYSTEM AND METHOD

CROSS-REFERENCE TO RELATED APPLICATION(S)

The present application claims priority from Provisional Application Ser. No. 60/237,165, filed Oct. 2, 2000, entitled AUTOMATED LOAN PROCESSING.

BACKGROUND OF THE INVENTION

The present invention relates to a system and method for instantly evaluating and authorizing on-line loan applications. More specifically, the present invention relates to a system for accepting on-line loan applications, processing the applications automatically, and generating loan offers based on the loan application and credit worthiness and conditioned on verification.

Traditionally, financial products, such as loans, have been marketed largely through financial institutions' literature and agents. The financial service provider relies on the agents for a large number of tasks, including acquiring demographic information, verifying the accuracy of the information, evaluating the information, and offering to sell products to the customer.

Technology has changed the landscape of the financial services industry such that agents play an increasingly shrinking role in marketing the financial products to consumers. As the Internet has grown in popularity, consumers shop for financial services over the Internet without the aid of an agent. ATM machines and other electronic devices that interact with existing financial institutions also provide opportunities for marketing financial services. For example, ATM machines offer loan services to customers at the time of deposit or withdrawal of cash. ATM customers can click a button, prompting an agent to contact the customer at a later time.

A growing number of online companies also provide loan services; however, these online companies currently fall short of fully automating the loan process. In the case of financial institutions, consumers can apply for loans or other financial services online; however, the loan approval process still requires the involvement of an agent. Third party providers of financial services can provide a list of available financial services based on criteria provided by the consumer, but the consumer must still contact the financial services agency directly or await a contact by an agent of the financial services agency.

BRIEF SUMMARY OF THE INVENTION

An automated, online loan processing system has a workflow engine supplied with a data dictionary and a set of rules which the workflow engine uses to process credit applications, render credit decisions, generate loan offers, and proceed with loan fulfillment over the Internet. Lenders configure lending criteria within the workflow engine relative to each of their loan products and compete with other lenders within the online marketplace. The workflow engine evaluates loan applications and delivers multiple "instant offers" to qualified borrowers within seconds. The system permits lenders to configure data content of online credit applications, rules for credit approval, lending criteria, grading criteria, and rules for fulfillment of loans. In addition, the workflow engine permits lenders to configure tasks within the workflow to be automatic, conditional, performer oriented, timed and so on. Consumers interact with the workflow engine via the Internet, complete loan applications, and choose from available loan options.

DETAILED DESCRIPTION

Figure 1:
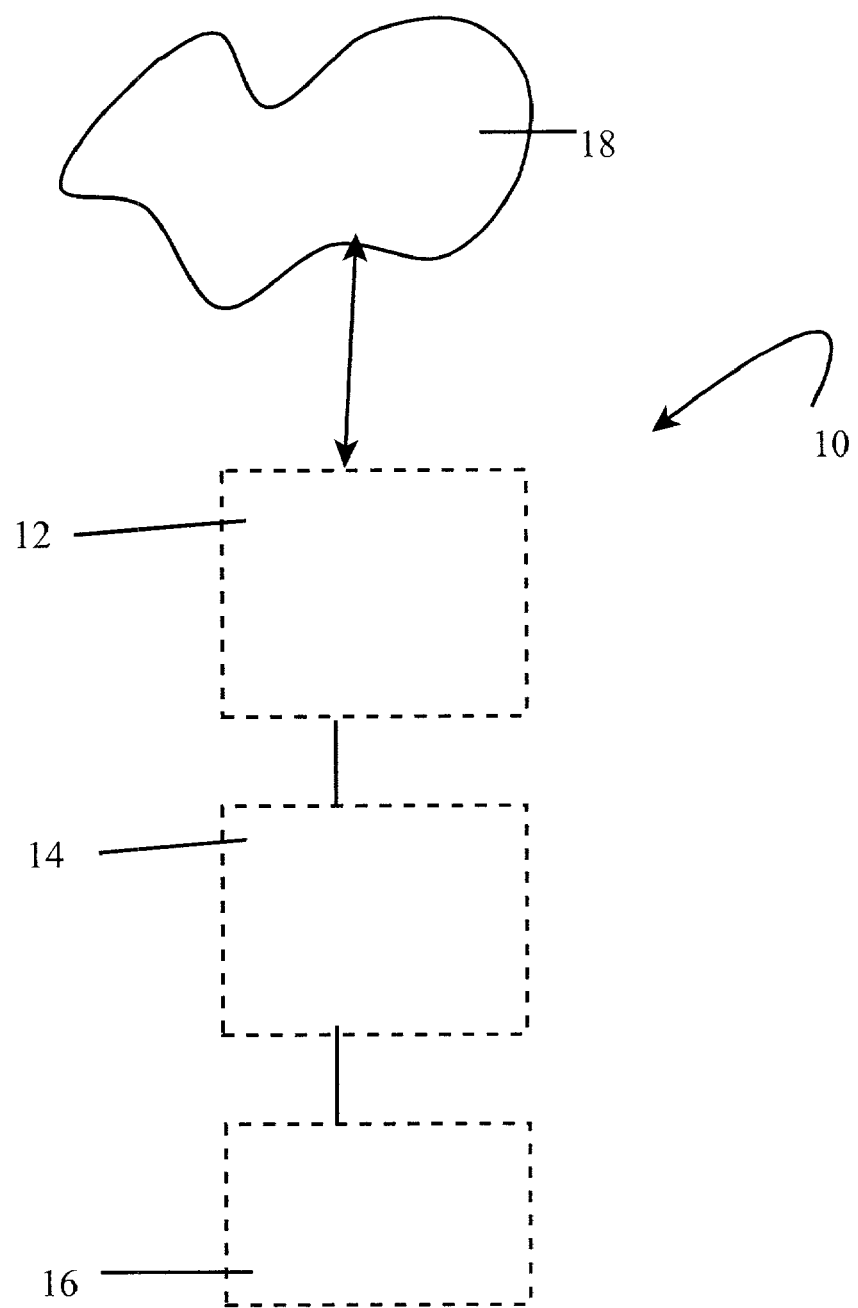
FIG. 1 is a block diagram of the system of the present invention.

As shown in FIG. 1, the automated, on-line loan system 10 of the present invention has a web server 12, an application server 14, and a database server 16. The web server 12 is in network communication with the Internet 18. The web server 12 provides the Internet interface for the client's web browser. Specifically, the web server 12 hosts dynamic web pages and provides an interface for clients to interact with the application server 14 and the database server 16.

The application server 14 provides the business logic for the loan system 10. The application server 14 synchronizes with the web server 12 for processing requests made by the client. Each request from the client proceeds through the web server 12, which transmits the required information to the application server 14. The application server 14 processes and acts on the request.

While web servers 12 are becoming increasingly flexible, and deployment engines such as Extensible Markup Language (XML) have blurred the lines between static web servers 12 and application servers 14, using an application server 14 to perform application processes provides a number of advantages. By removing the application components from the web server 12, the workload is divided between the two servers, thereby maximizing processing efficiency. Application servers 14 provide network administrators with tools for managing components and runtime services, such as session management, synchronous/asynchronous client notifications and for executing server business logic.

Additionally, the application server 14 provides a level of fault tolerance. The application server 14 provides the ability to eliminate single points of failure. Administrators can configure the application server 14 to define recovery and failover policies in case of a failure of one object or component. The application server 14 assists in load balancing, transaction management, and security in that it can route requests to different servers according to various parameters. Additionally, redundant application servers can be in place so as to provide fault tolerance and reroute loan requests in the event that an application server 14 fails.

Generally, the application server 14 is an "active application server." In other words, the application server 14 supports and provides an environment for server-side logic expressed as objects, rules and components. The application server 14 resides between the web server 12 and the database server 16. The application server 14 serves to process data for the web server 12 and the database server 16. A workflow engine 20 resides on the application server 14 and interacts with the database server 16 to process credit applications and to fulfill loans.

The application server 14 interacts with the database server 16 using any number of routable protocols, such as TCP/IP, IPX/SPX, and the like. Custom scripts may also be used. In the preferred embodiment, the database server 16 is compliant with Open Database Connectivity (ODBC) protocol, a standard connectivity protocol developed by Microsoft Corporation for interacting with relational databases. In the preferred embodiment, the application server 14 is an Microsoft SQL 2000 Application Server.

The database server 16 may be implemented in any number of development environments, such as SQL Server, Oracle Server, Sybase Server and the like. In the preferred embodiment, the database server 16 is developed using Microsoft SQL 2000, which is ODBC-compliant and which is readily portable to other database environments.

By using the same server topology for both the application server 14 and the database server 16, "overhead" management is simplified because administrators of the system 10 need only familiarize themselves with a single server topology. Furthermore, transmission of data from the application server 14 to the database server 16 involves routing. To the extent that the servers are separated geographically, such transmissions involve routing through several relay points, with each relay adding a small delay. The relationship between distance and delays is not linear. A transmission delay will be greater for points which involve a change of "backbones." For example, if a router point involves changing from a Sprint network to an MCI network, such a transition may involve a greater delay that if the switch occurred between two MCI networks. The Internet Backbone is a metaphor for the interconnectivity of Internet Service Providers (ISP). Similar to Internet backbone routing, within a Local Area Network (LAN), switches between different server topologies invoke filtering processes, and latencies may be introduced. Thus, by using the same server topologies for the application server 14 and the database server 16, filtering and routing delays are minimized.

With respect to FIG. 1, it is assumed that the web server 12, the application server 14, and the database server 16 are hosted by an ISP, such that the ISP provides a firewall (not shown) between the servers and the Internet 18. However, if a bank or other financial institution were to host the automated loan processing system 10, a firewall would be included in the system, positioned between the Internet 18 and the web server 12.

Banks and other financial institutions interact directly with the web server 12 and indirectly with the application server 14 and the database server 16, over a secure connection via the Internet 18. Similarly, clients, such as individuals seeking a loan, interact with the web server 12 through a secure portal in a firewall. Both the clients and the financial institutions interact via a web interface. In an alternative environment, the bank or other financial institution hosts the application server 14 and the database server 16; therefore, the interaction between the bank employees and the database server 16 need not be effected via the Internet 18, and may instead be contained entirely inside the firewall. Nevertheless, the browser-based interface is still used to interact with the system 10, such as with a corporate Intranet. In the preferred embodiment, interaction with the database server 16 is effected using a browser-based web interface so that the interface may be implemented cross-platform with a minimum of administrative overhead.

The automated loan system 10 may be provided over the Internet 18, such that banks or other financial institutions are commercial clients of the system 10, and individual consumers are individual clients of the system 10. Alternatively, the system 10 may be hosted by a bank or other financial institution, such that the individual consumers interact with the system 10 over the Internet, and the bank hosts the web site interface, controls the various instruments available to the consumer, and administers the system 10 via an Intranet backbone. In the preferred embodiment, the system 10 is not hosted by a bank or financial institution, such that multiple banks and financial institutions offer financial products through the system 10.

The system 10 allows each bank and financial institution to control loan processing parameters within the system 10, which are used to evaluate loan applications. Each bank configures its own "Data Dictionary" using the bank's terminology and data. The Data Dictionary is stored in a database, which the workflow engine accesses to present bank-specific forms and to process bank-specific workflows. Thus, each bank or financial institution can customize the workflow engine 20 to process loan applications according to its loan authorization criteria. The bank's selection criteria, instant loan packages, interest rates, closing costs can be modified by an authorized bank employee at any time, and the changes can be made effective immediately or at some future time.

Figure 2:
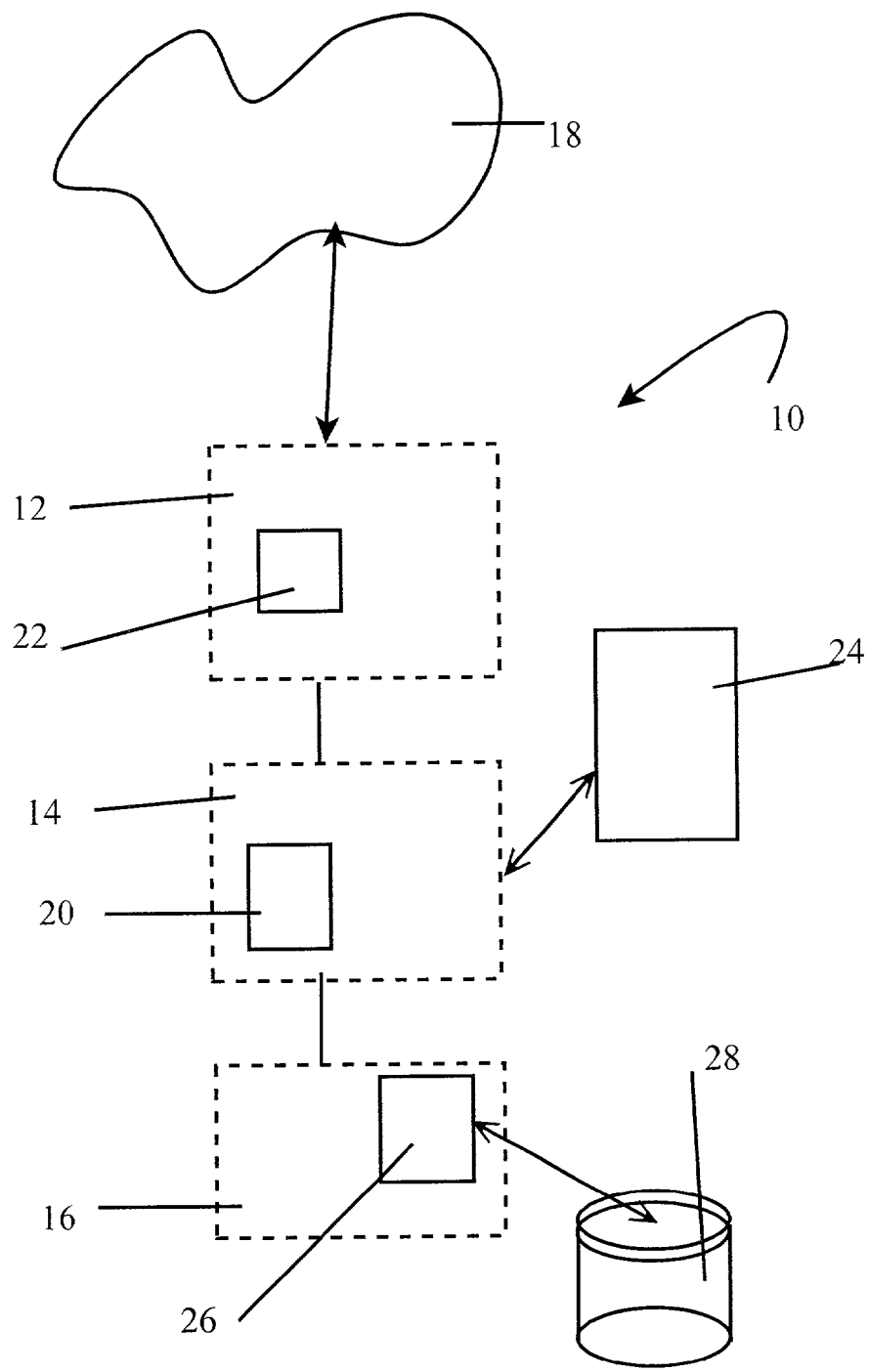
FIG. 2 is a schematic block diagram of the system of the present invention.

FIG. 2 shows a web server 12, providing a web site interface 22, in network communication with an application server 14, containing a workflow engine 20. The application server 14 is in network communication with a workflow designer 24 and with a database server 16, having a database engine 26 and a data store 28. The database server 16 hosts interactions between the application server 14 and the database engine 26 and data store 28. In one embodiment, the database server 16 hosts the database engine 26 and data store 28. In an alternative embodiment, the database server 16 hosts and routes transactions between a user and the database engine 26 and its associated data store 28. In the preferred embodiment, the database server 16 hosts interactions with multiple database engines 26 and data stores 28.

The workflow designer 24 is an administration tool used by the banks or financial institutions to customize workflow parameters, define checklists and define selection criteria for lending and deposit processes within the workflow engine 20. The workflow designer 24 may reside on the application server 14 or on any computer in network communication with the application server 14. In the preferred embodiment, the workflow designer 24 resides on a computer separate from the application server 14 that is on the same LAN as the application server 14.

Generally, the workflow designer 24 provides an object-based, graphical interface modeling the individual tasks required to complete a task within a bank. Each task is an individual piece of work required to complete a process. Tasks may be completed by a person, may be automated, may be completed automatically through the passage of time, or may be conditioned on additional information. Tasks may also be a combination of timed and some other type, such as "person timed" or "automated-timed" and so on. All tasks may be conditionally started using selection criteria.

The workflow engine 20 uses selection criteria to evaluate all loan or deposit data captured during the application submission (and through related tasks) and to render decisions as to whether or not to start a task. All tasks are completed in the sequence defined by the checklist. Roles, performers, branches, banks and other units are also defined using the workflow designer 24.

The workflow designer 24 utilizes an object based representation of the internal software processes to allow for modification of the workflow process after the workflow engine 20 is compiled and installed. Furthermore, the object-based workflow designer 24 permits dynamic alterations to the workflow engine 20, such that the entire workflow process may be re-ordered or the steps rearranged without restarting the application server 16 or reinstalling the workflow engine 20. Simply clicking on a visual representation of a task in the window and dragging the object on the screen, a task may be removed and reinserted into the workflow. Connection arrows may be deleted and reinserted to reorder the workflow process.

In the present invention, the workflow process may be preconfigured, such that each bank may modify only the parameters within each pre-established task, or each bank may add and delete specific tasks, control the arrangement of tasks within the workflow process, and modify the parameters. In the preferred embodiment, the workflow checklist (the workflow process as exemplified by the ordered arrangement of task objects) may be customized for each bank and for each loan type within the bank, such that the workflow engine 20 process loan applications uniquely for each loan type.

The workflow engine 20 and the workflow designer 24 may be written in any number of object-based computer languages, such as C++, Java, and the like. In the preferred embodiment, the workflow engine 20 and workflow designer 24 are compiled in C++.

The workflow designer 24 provides an object-based interface for configuring and modifying workflow processes, wherein processes or functions may be abstracted individually or in groups to allow for object-based modification of the workflow process. Specifically, manipulation of objects on a computer screen alters the workflow process for the workflow engine 20, such that the objects serve as abstract representations of individual or groups of functions to be performed by the workflow engine 20.

The workflow designer 24 is used to define performers, roles, checklists, selection criteria, and tasks within the workflow engine 20. Performers include the Administrator, loan officers, and other bank personnel involved in the loan process. Performers may include a loan officer or user or another software application. Roles are permissions and/or responsibilities assigned to each performer within the system 10. Performers may be associated with more than one role. A checklist is a workflow definition that may correspond to one or more processes or subprocesses within the workflow process. Selection criteria are benchmarks or threshold criteria for evaluating captured data. Tasks are electronic instructions interpreted and executed by the workflow engine 20.

Generally, the workflow designer 24 permits an authorized user to create workflow processes, configure and enforce policies, establish work queues that act as dynamic to-do lists for staff, store and track unique data, define, design and produce reports, and so on. Thus, in addition to automating tasks and making decisions with defined processes, the workflow engine 20 can serve as a task management and productivity evaluation tool. Loan officer can use the website interface 22 to access work queues, check work loads and assign and reassign tasks. In addition, the loan officer can use the designer 24 to flag potential consumers for unique cross-selling opportunities, such as other financial products and so on.

The workflow designer 24 includes several functions or components: the designer component (used to establish workflow processes), the loan director (used to oversee applications and workflow), the e-loan director (used to view status), and the bank workflow setup (used to establish workflow parameters). The loan director is a software component comprised of web forms and executables that allow a financial institution to perform back-end loan and deposit processing. The software provides a process-based approach to loan and deposit processing. These forms allow the financial institution to establish a checklist for back-end processing that manages the workflow and sends/receives data to and from third party processes. Using built in interprocess communications, the loan director interface manages data access across applications that perform such operations as extending credit scoring, loan document preparation, and other services. The loan director also offers many direct interfaces to such services as Experian, Freddie Mac, Fannie Mae, Calyk Software and others. The loan officer view is a built in software component which allows the loan officer to see the status of any loan on a real time basis. The executive view, another built in software component, provides the senior executive of the financial institution with up to date information on the number of loans processed in any region or branch, analysis of the productivity of each and every loan officer, and other valuable statistical data on productivity.

The loan workflow e-loan director is an Internet-based, front end application software package with extensive features for application processing, as well as automated loan status reporting for the customer and third party providers such as real estate agents, insurance agents, appraisers, auto dealers, and the like. When the lending institution receives the application data, the back-end loan workflow engine 20 is activated instantly to perform automatic decision analysis for credit scoring, ratio analysis and other credit checks to meet the selection criteria of each financial institution. If a match takes place, the customer is informed within seconds about the instant conditional offer. In the preferred embodiment, the customers informed within 45 to 60 seconds or sooner.

The e-loan director software component offers an extensive messaging facility to the consumers and third party providers to interact with the lenders. Once an offer is accepted by the customer, the status of the fulfillment process (verification, processing, underwriting and closing phases) is communicated to the customer and other third party providers automatically within the system 10. The e-loan director software can be separate component installed locally in the bank's servers; however, in the preferred embodiment, the e-loan director is a web-based component that can reside on any computer in network communication with the web server 12.

The workflow designer 24 is used to define the workflow process for accepting applications, underwriting and closing on loans. The workflow designer 24 allows bank administrators to establish and enforce bank policies and guidelines for lending and deposit processes, to establish work queues that act as dynamic to-do lists for bank staff to use as task management tool, to store and track unique data, and to access work queues to check workloads and reassign tasks. Essentially, the workflow designer 24 serves as an administrative tool for modifying the order and parameters of workflow processes and for monitoring the progress of applications through the process.

The banks use the workflow setup to enter specific selection criteria values outside of the workflow designer 24. The workflow designer specifies what decision data items can be used by individual bank branches within the system. Each individual branch or unit enters the actual parameter values by which decisions are rendered. Thus, bank policy can be centrally controlled using the workflow designer 24, while individual units have control over their own selection values. Thus, bank branches within a single bank can compete with each other for consumers. One branch may choose to target highly qualified loan applicants with competitive interest rates, while another branch may target higher risk loan applicants with above-market interest rates.

The workflow engine 20 uses the parameters to render credit decisions and extend instant offers. Financial institutions can attach loan offer details to selection criteria that allow for conditional, instant, automatic loan offers over the Internet. The workflow engine 20, in conjunction with the established checklists and parameters, provides a real-time, twenty-four hour a day, seven day per week, loan approval system 10.

The e-loan director, loan workflow setup, and instant offer features are browser based components of the system 10. These components are scalable, assuring superior performance regardless of the number of concurrent users or system configuration changes.

To configure the automated loan processing loan system, a systems administrator logs onto the system 10 via the e-loan workflow setup interface, and creates loan categories, sub categories and loan types in the bank and loan databases. The loan categories, subcategories and loan types are provided a data dictionary which a software database attached or linked to the workflow engine. Next, the system administrator assigns decision data items to loan categories, subcategories and loan types. Again, the decision data items are provided by a data dictionary connected to the workflow engine. In addition, the decision data is stored in the bank database. Once the bank database and loan categories, subcategories and loan types have been populated in the data dictionary and the bank database, each financial institution can select loans to administer by choosing appropriate category, subcategory and/or loan type. A financial institution enters selection criteria values for any selection parameter it wishes to use in making a loan acceptance decision. If no value is entered for the selection criteria item by the financial institution officer or administrator, that selection criteria item is not used.

Each change or addition or selection of selection criteria values within the loan acceptance decision process is stored in the bank database. Once the bank has populated the selection criteria for each of its loans, the loan types and loan categories are made available to consumers from the web interface 22. The loan applicant submits the loan registration form or loan application to the workflow engine 20 to be processed. The workflow engine 20 determines if the loan request is handled by the financial institution based on categories, subcategories, and loan type. Additionally, the workflow engine 20 determines whether the loan may be offered the applicant's state (whether the various lending institutions are licensed to offer loans in specific states and so on).

Conceptually, the workflow designer 24 is employed to configure the workflow engine 20. Consumers then visit a web site interface 22 hosted by the web server 12. The web server 12 provides a web site interface 14, which includes a form or template for the consumer to complete and submit. In the preferred embodiment, the web pages forms are provided as Active Server Pages (ASPs) so that the form can be served dynamically by the web server according to the type of loan.

The consumer submits the completed form and the application server 14 processes the information using the workflow engine 20. Depending on the specific workflow process implemented using the workflow engine 20 and designed using the workflow designer 24, the workflow engine 20 process the workflow checklist.

The power of the workflow engine 20 is highlighted by its automation capabilities. Specifically, once the workflow engine 20 is configured using the designer 24, entire processes can be performed by the engine 20 without human interaction. For example, within the financial services industry, the entire loan process, from application to qualification to verification and fulfillment, may be performed automatically by the system 10 and without human interaction.

In an automated loan process, a bank officer uses the components of the workflow designer 24 to administer and oversee the workflow process, including defining checklists and selection criteria for bank lending and deposit processes. The workflow designer 24 provides a graphical model to allow the bank officer to specify individual tasks required to complete a process within the bank. A task may be defined by the user to allow for person-based tasks, automated tasks, timed tasks, conditional tasks, and so on. Tasks may also be person-based and timed, conditional timed, automated-timed or automated with conditions, so that each discrete task can be handled in a variety of ways by the system 10.

Generally, person-based tasks require the involvement of a loan officer at the bank, or some other human involvement. Automated tasks are performed by the system 10 without human involvement. Timed tasks and conditional tasks are performed or executed by the system 10 when a set amount of time has transpired or the conditions are met, respectively.

Figure 3:
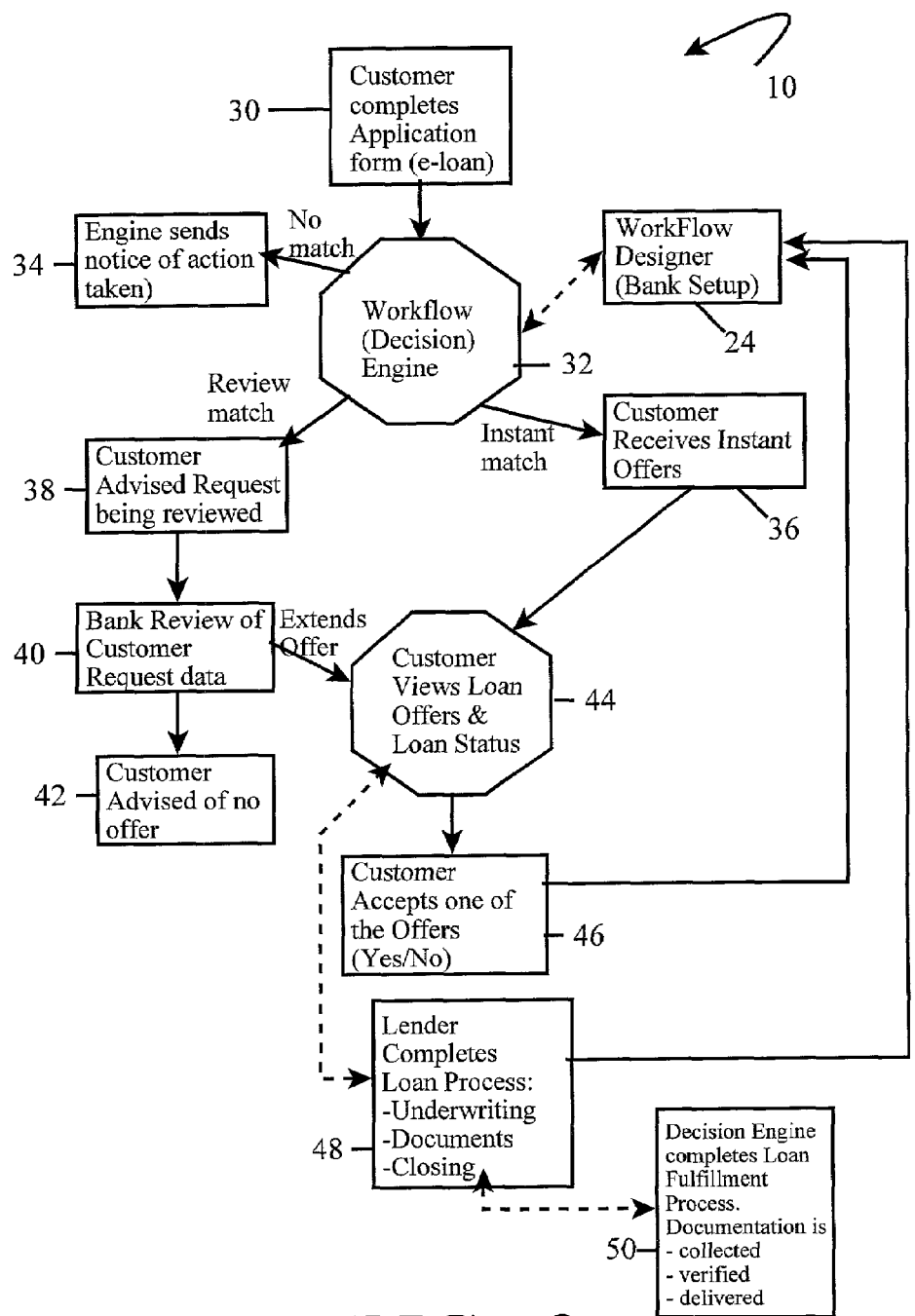
FIG. 3 is a schematic flow diagram of the automated loan process of the system of FIG. 1.

As shown in FIG. 3, the system 10 handles the entire loan process, from application to fulfillment for each participating lender. First, a customer completes the application form (step 30). The application form is completed on the Internet interface 22 via a secure connection. The Workflow (decision) engine 20 processes the application for loans that match the application information (step 32). If there is no match, the workflow engine 20 notifies the applicant that no match was found (step 34), and informs the applicant of the next steps in the process. For example, certain lending institutions may wish to have a loan officer manually review all rejected and/or "no match" loan applications, in which case the applicant will be notified that his or her application has been forwarded to a loan officer at "X" bank for further review. Another bank in the system 10 may choose to notify the applicant of other loan opportunities that may be available, and so on.

If the workflow engine 20 detects an instant match (the applicant qualifies for a loan), the workflow engine generates an instant offer (step 36) using an offer template associated with the selection criteria for that bank. Thus, each bank can customize its own forms within the system 10. If the applicant does not qualify for an instant offer, the workflow engine 20 evaluates the bank setup checklist created by the bank for that particular loan offering, and may refer the application to a bank officer for review (according to the checklist).

If the workflow engine 20 refers the application to a loan officer, the workflow engine notifies the customer (step 38), and the bank reviews the customer's application (step 40). If the bank does not wish to extend an offer, the workflow engine 20 will advise the customer that no offer has been extended (step 42). However, if the bank extends an offer or the workflow engine 20 extends an instant offer to the applicant, the applicant can then review a list of loan offers (step 44), and either accept or decline the offers.

If the applicant accepts one of the offers (step 46), the workflow engine 20 notifies the bank corresponding to that offer, and a loan officer at the bank processes the loan using the workflow designer 24.

As shown, the lending institution completes the loan process (step 48), including underwriting the loan, completing the documentation, and closing. Additionally, the workflow engine 20 can complete the loan fulfillment process by collecting and verifying the documents and delivering the documents to the bank (step 50). Thus, loan officer involvement is minimized.

This process and interaction is performed for all participating lending institutions. When a customer completes an application (step 30) and submits the application to the system 10, the workflow engine 20 parses the application data to determine the applicant's location and the type of loan sought. The system 10 may not be authorized to service loans in particular states, so some applicants may be rejected outright or referred directly to a loan institution already existing in the applicant's state of residence. Alternatively, if the system 10 is authorized to service loans in the applicant's state, the workflow engine 20 evaluates the selected loan type against the loan types offered by all participating lenders. If there is a match for one or more lenders, each lender's loan process "checklist" is followed by the workflow engine, so that the applicant potentially can receive multiple instant offers from multiple lenders.

Additionally, individual branches within a single bank may compete for loan applicants. For instance, two branches from one bank may have slightly different instant offer criteria, resulting in two instant offers with different options from the same bank. Thus, banks and branches compete for business through the system 10, and the customer can choose the best loan option.

Finally, the workflow engine 20 routes the acceptance to the bank branch closest to the applicant, to facilitate the loan processing. Using the applicant's zip code and address, the workflow engine 20 automatically routes the acceptance to the closest branch.

The workflow engine 20 has the capacity to fulfill the loan, that is, to obtain an acceptance from the lender, produce the signature documents, and schedule and arrange for the borrower to visit an office to complete the verification and signature process. Additionally, the workflow engine 20 can control the automatic (electronic) disbursement of funds. Using an interface to the lender's internal loan processing systems, for example, the workflow engine 20 can automatically accept and fulfill the loan according to the lender's workflow parameters.

In the United States, banks typically fulfill their own loans, and then, especially in the home-mortgage market, often will resell the loan to another wholesaler lender. On the other hand, in India, fulfillment of the loan is typically handled by a third-party, and only after the customer signs loan documents (and provides the third-party operation a set of pre-signed and post-dated checks). Once the signature and additional documents have been acquired, all documents are forwarded to the bank. In India, there is currently no secondary loan market, thus banks do not resell the loan. Thus, the loan fulfillment component functions in the same manner as the loan application/offer generation components.

By automating the entire process through the workflow engine 20, the user interaction from application to receipt of the funds is seamless. Furthermore, the system interaction is centralized, so that the offerings, control, acceptance, fulfillment and so on, are all generated by the workflow engine 20 and can be managed from the administrative tools.

The flexibility of the workflow engine 20 and the entire system 10 is in the reliance of the workflow engine 20 on the checklists. Checklist parameters and functions can be altered on the fly, so that no change needs to be made to code to accommodate the fulfillment requirements between two different countries, two different banks and so on. Thus, the checklists allow the system 10 to be extremely flexible and changeable. While the specific user interfaces may need to be changed to accommodate differences between different locales as they two locales may represent different cultures, may use different idioms, money denominations, expressions, and the like. However, the system 10 may be readily adapted for use in a variety of environments and cultures around the world with minimal changes. The workflow engine 20, administrative tools and checklists allow the system to be re-useable with no modification to the underlying code.

The workflow designer 24 provides an administrative tool set for setting up the checklists for each loan, adding and deleting loan offerings, modifying parameters within each loan checklist, and generally customizing the lending process checklist for each bank. Additionally, the workflow designer 24 provides reporting capabilities and workflow management tools for loan administrators at the various lending institutions to oversee the loan fulfillment process via the system 10.

Each loan offering must be created in the system 10 by a loan officer using the workflow designer 24. In one embodiment, the workflow checklist is static for each institution, and each lending institution can configure only the parameters associated with the various tasks within the checklist. In the preferred embodiment, the checklist or workflow process is dynamic for each loan offering, such that the system 10 is infinitely customizable. In the preferred embodiment, each bank can implement numerous different workflow checklists.

Thus, the workflow engine 20 as shown provides a first pass automatic loan offer system that allows a consumer to apply for a loan and receive a conditional loan offer within seconds. The loan offer is conditioned on the accuracy of the information provided by the applicant. At the time of closing of the loan, a notary or witnesses will be required to witness the applicant's signature on the loan acceptance document, thereby verifying that the applicant's identifying information is correct. Thus, the applicant's identity will be verified by a person.

In an alternative embodiment, digital signatures or other electronic verification means may be used to verify the authenticity of the applicant's information. In such a case, the applicant can sign the loan documents that are mailed or electronically transmitted to the applicant by the bank or financial institution.

Generally, the automated loan system 10 accepts on-line loan applications from a consumer and processes the on-line loan application using the decision engine 20. The decision engine 20 retrieves a checklist from the database 28, and uses the information provided on the loan application to make an immediate credit decision. The system 10 can make an instant loan offer to the applicant based on the credit information and a retrieved credit rating, reject the application, or refer the application to a bank loan officer for review. If the application is rejected, the decision engine 20 instantly generates a rejection notice, and passes the notice to the web server 12 to display the notice for the applicant. If the application is accepted, the ATL Decision Engine generates an instant offer, or list of offers, and displays the offer(s) to the consumer for his or her review.

The system 10 may host automated loan services for multiple financial institutions. Each financial institution in the system 10 has its own performers, roles, loan types and loan criteria. In one embodiment, the roles, loan types and loan decision process are the same for all participating financial institutions. In the preferred embodiment, the roles, loan types and loan decision process are customized by each financial institution. Thus, each bank can provide customized forms and custom loan decision processes for its on-line loan offerings.

The instant loan implementation of the workflow engine 20 allows a consumer to apply for a loan on a single form and receive multiple instant loan offers over a secure connection on the Internet. From the convenience of home, consumers can apply for loans, receive and compare multiple offers, and accept a loan offer within a matter of seconds.

Figure 4:
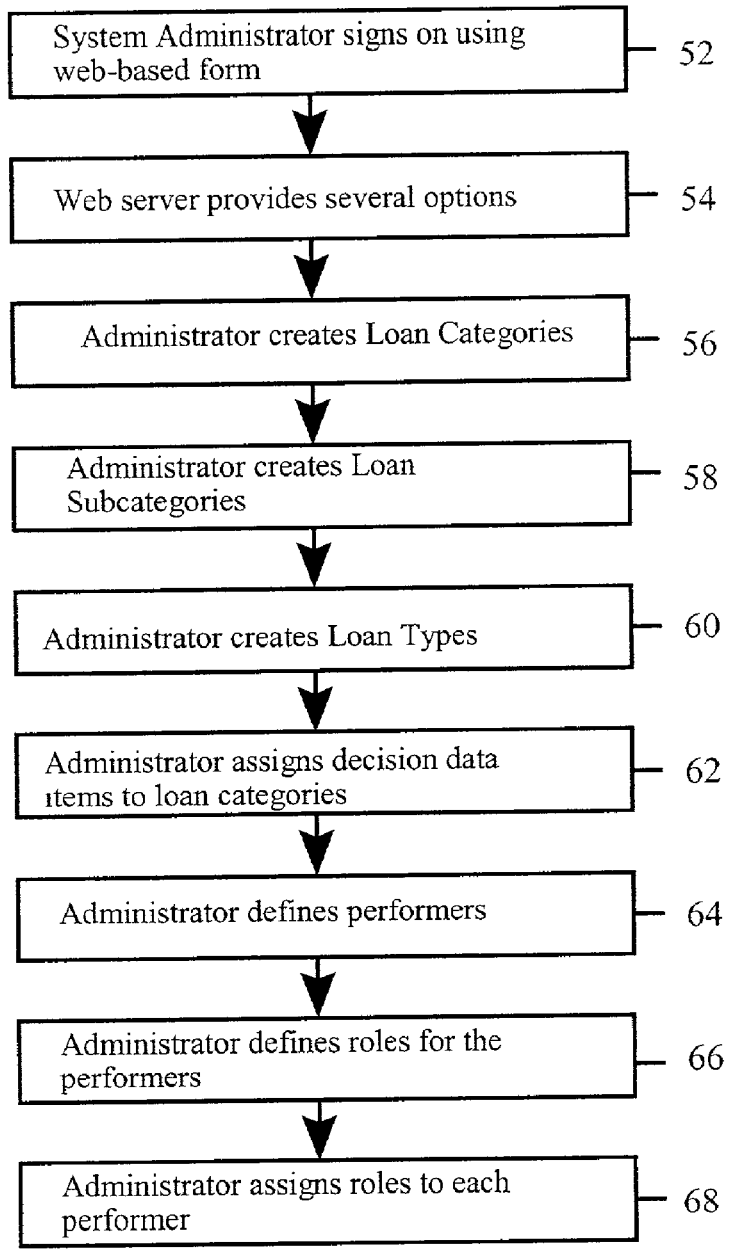
FIG. 4 is a schematic diagram of the process for using the workflow designer to set up the workflow process of the system 10.

FIG. 4 provides a schematic flow diagram of the set up process for configuring the workflow engine 20 to provide instant, automated loan services. An administrator at the financial institution signs onto the system 10 using a web-based form (step 52). The web server 12 provides the administrator with several options (step 54): access loan designer, view works in progress, generate reports, pending applications, and so on. The System Administrator creates loan categories (step 56), such as consumer, mortgage, commercial, agricultural and the like. Then the System Administrator creates subcategories (step 58), such as purchase or refinance, new or used, and the like. Finally, the System administrator creates loan types (step 60), such as car loan, home equity loan, and so on. Each of these loan categories, subcategories and types are stored in the database 28 for later retrieval.

Next, the System Administrator assigns decision data items to loan categories, subcategories and loan types (step 62). The decision data items include tasks and checklists. Each category, subcategory and loan type has its own decision workflow, which may be completely different from other categories and subcategories, such that the required information, credit standing and so forth may vary from on loan type or category to another, and between loan types in the same category.

Finally, the System Administrator defines performers within the system (step 64). Then, the System Administrator defines roles for the performers (step 66), such as loan officer, Administrator, manager, and so on. The System Administrator assigns roles to each performer (step 68).

Generally, the System Administrator is defined within the system 10 prior to the setup process, but it is generally desirable to define an Administrator performer separate from the pre-defined top-level administrator in order to perform routine maintenance and updates. This secondary Administrator performer can be given limited permissions to prevent unintentional changes to user settings and the like. Once the loan categories and types are created, an officer at the financial institution can configure the loan decision process and the parameters associated with the process using the workflow designer 24.

Figure 5:
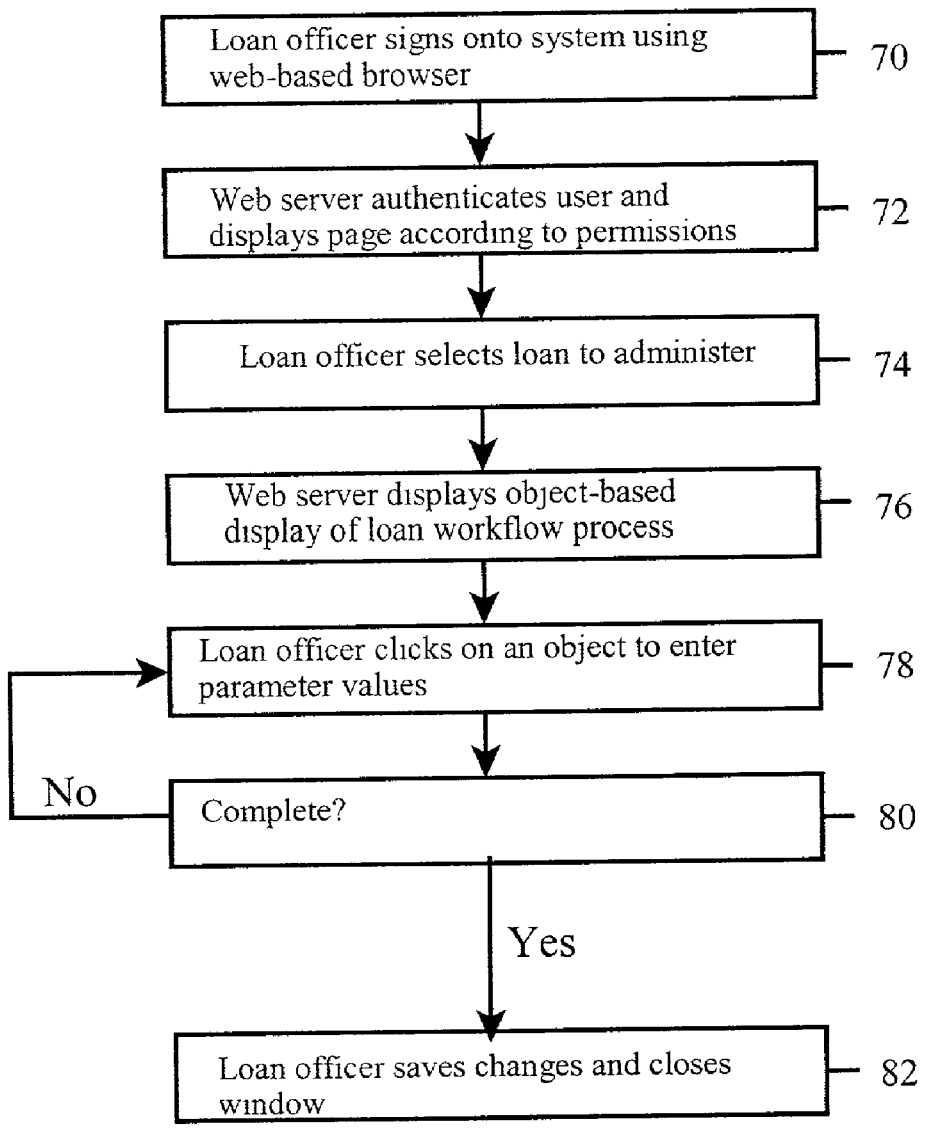
FIG. 5 is a schematic flow diagram of the process for using the workflow designer to configure the subprocesses of an established workflow in the present invention.

As shown in FIG. 5, the loan officer logs onto the system 10 using an Internet browser (step 70). The web server 12 authenticates the user, retrieves permissions and loan information from the database 28, and displays a web page according to the user's permissions (step 72). The loan officer selects a loan to administer by selecting the category, subcategory and loan type (step 74) from a clickable list on the web page.

The workflow designer 24 interacts with the web server 12 to display an object-based display of the loan acceptance workflow process (step 76). The workflow process may be a default process scheme established by the Administrator, a standard workflow process may be hard coded into the system 10, or it may be configured by the loan officer at this point.

Assuming the workflow process is already established, the workflow designer 24 displays an object-based workflow form (step 78). The loan officer clicks on a shape on the screen to enter selection criteria values for any parameters used to make loan acceptance decisions (step 80). Each shape represents a task within the workflow process. By changing the parameters associated with a task, the loan officer changes the basis for loan acceptance decisions relative to that subprocess. The loan officer saves the changes, and the system prompts the officer to see if the officer is finished modifying the loan process (step 80). If no value is entered by the loan officer for a particular loan selection criteria, that loan selection criteria is not used by the system 10. The modification process is repeated for each task with the loan process, until modification is complete. Then, the loan officer saves the changes by clicking on a button and closes the window (step 82).

In the object-based workflow designer 24, the loan officer may alter the workflow process by simply dragging objects around and reassigning the links, such that the order of the process is rearranged. In addition, the loan decision process may be set up by the loan officer, rather than having default process settings. In an alternative embodiment, the workflow process is preestablished, such that the bank officer or administrator cannot change the workflow process, but can only alter the parameters associated with each step in the process. In the preferred embodiment, the workflow process may be created dynamically by the bank officer during setup and may be altered dynamically at any time by an authorized bank officer. Furthermore, the bank officer may assign specific functions to each step of the process such that object representations and their associated functions may be altered dynamically by the bank officer using the workflow designer 24.

Figure 6:
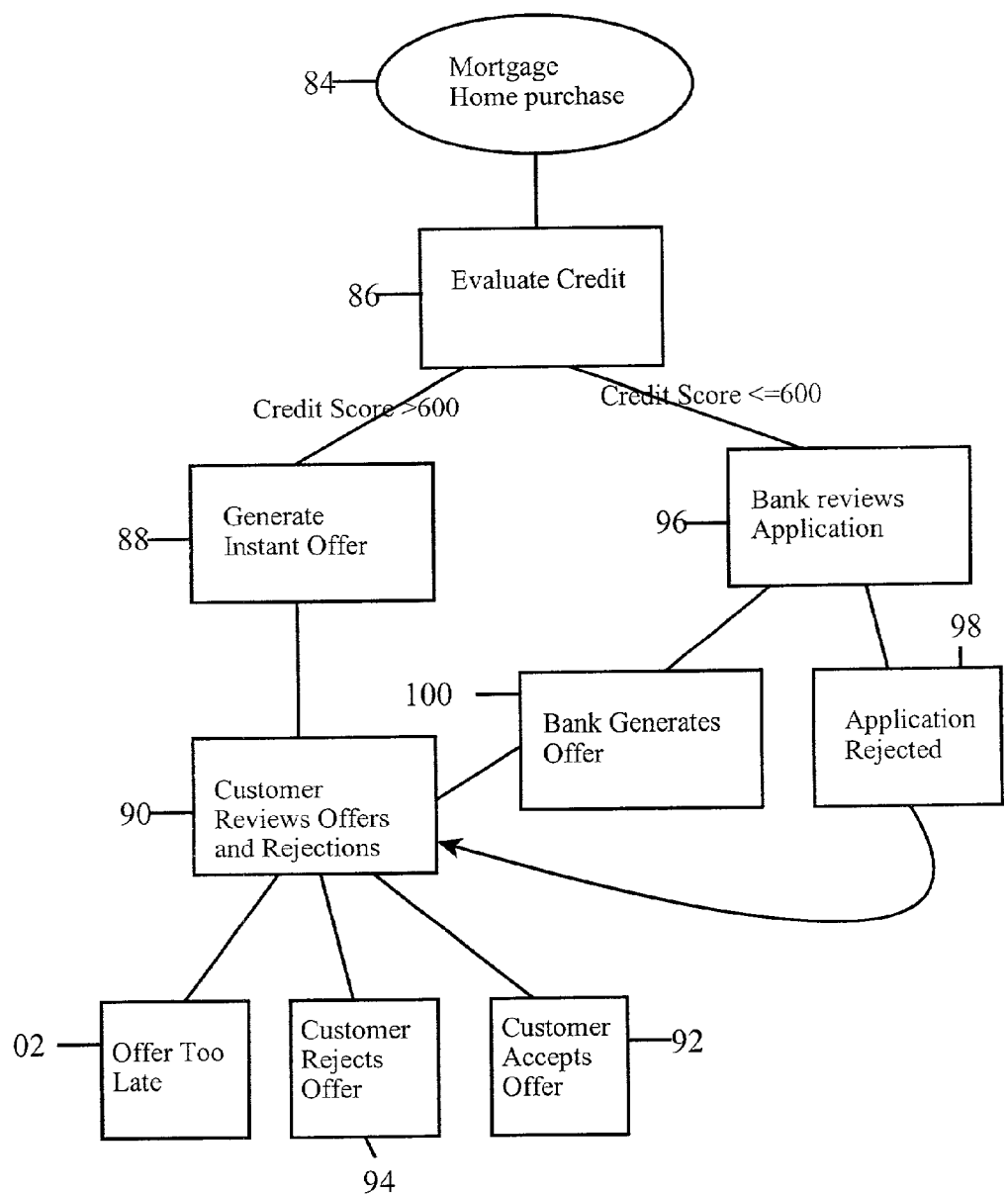
FIG. 6 is a schematic flow diagram of the instant offer loan process of the present invention.

As shown in FIG. 6, the workflow process for a purchase loan for a home is displayed as an object-based flow diagram at the macro level. In other words, micro processes associated with each object of the flow diagram are not displayed; however, the subprocesses and their associated parameters can be modified using the workflow designer. Each loan type or category may be configured for a different loan workflow process and with different parameters, such that an individual who does not qualify for a home loan, might still qualify for other loans or credit opportunities on the system 10.

The home purchase workflow process begins with the selection by a consumer of a loan category "consumer" and subcategory "purchase", then the loan type is selected as "home mortgage" (step 84). The web server 12 presents a web-based loan application form for the consumer to complete. Since the loan application form requires sensitive financial and credit information, the web server 12 displays the form using a secure socket layer (SSL) or other secure connection protocol over the Internet 18.

The first page of the application requires general personal information such as full name, address, occupations, purpose of the loan and so on. Once the consumer has completed the form, the consumer submits the form to the web server 12. In the preferred embodiment, the system 10 employs Active Server Pages (ASPs). ASPs provide server-side scripting of web pages, combining HTML with JavaScript, VBScript, or any other popular scripting language to create server applications. ASP also provides for component-based development by allowing the inclusion of COM-based server components. ASP pages are created with a default extension of ".asp", as opposed to the standard "htm" or "html" extensions of static web pages.

When the web server 12 gets a request for an ASP page, the web server 12 accesses and compiles the script contained within the page and loads the compiled code into memory. The script then performs some processing, which usually generates HTML that is then written out to the ASP page. The static and script-generated HTML of the ASP page is then returned to the client using a regular HTTP transaction. To the end user or consumer, the ASP-generated page looks no different than another static HTML page, except for that ".asp" extension.

The web server 12 evaluates the form submitted by the consumer using the ASP scripts. Depending on the loan type (for instance, mortgage loan, or business loan, and the like), the web server 12 may display an ASP-generated second page requiring additional information. If, for instance, the loan is for a business, the second page of the application requires information related to the business, including corporate ownership information and the like. If the form is for personal home mortgage, the second page requires salary information, educational background information, and so on. Once the consumer finishes the second page, the consumer submits the second page to the web server 12, which passes the information to the application server 14 for further processing.

The ASPs also evaluate the information provided, to ensure that the form is completed correctly. Certain fields, such as name, address, city, date of birth, and so on, are considered essential for purposes of identifying the consumer. The ASPs evaluate the form data to ensure that the telephone number field has the correct number of digits, that essential fields have been entered, and so on. Thus, when the information is submitted to the application server, the data entry is complete. While the ASPs do not necessarily verify the accuracy of the information at this stage, server-side objects can be used to verify names and addresses against National Change of Address databases, telephone directory databases and the like in order to verify superficially that the applicant exists. Once the consumer submits the form, and the ASPs verify the information, the form is passed to the application server 14 where the workflow engine 20 programmatically evaluates the submitted form (step 86) (step 86 is shown in greater detail with respect to FIG. 7). In the United States, credit bureaus, such as TRANSUNION, EQUIFAX and the like, maintain credit information relating to each consumer according to his or her social security number. Creditors can access credit information relating to credit applicants by accessing secure databases of these credit bureaus. Based on such information, the creditors typically generate a credit score, which can then be compared against lending criteria to render a decision. In other countries, such as India, where there is no credit bureau for providing a credit score describing the applicant's credit history, complicated evaluation techniques must be employed (as discussed with respect to FIG. 7).

In the United States, data collected from the credit bureaus is stored in a datafile associated with the applicant. Loan officers at a participating bank may access the credit bureau information to further evaluate a loan application. Addition information that is generally considered "external" to the loan process may also be accumulated and stored with the applicant's information. Such additional information may include Flood Zone reports, legal documents, and so on. The system 10 treats this information as "external data" and allows for complete import and export of the data. Additionally, the system 10 displays the external data upon request by a loan officer. The system 10 renders the external data using XML and XSLT for maximum import/export capabilities. While other web extensions and CGIs may be equally effective, XML and XSLT are the preferred modes for rendering the external information because they are the most extensible and flexible at this time. Thus, the system 10 allows for easy data manipulation from external sources, and can easily accommodate any Electronic Document Interchange (EDI) formats and/or participate in Business-to-Business (B2B) processes. Standard EDI formats are commonly used for transfers of electronic funds, check disbursements and the like. Similarly, B2B processes include extending payments, as well as displaying packing lists and invoices. Since the system 10 can represent data in XML formats, both EDI and B2B transactions can be effected automatically by the system 10.

The workflow engine 20 uses a checklist created by the workflow designer 24 to evaluate and process the application. FIG. 5 illustrates the checklist from a macro level, but does not illustrate the various functions performed by the workflow engine 20 within each subprocess. Thus, as shown the workflow engine 20 evaluates the credit of the applicant and generates a credit score based on the parameters of the particular financial product controlled by a financial institution. (step 86). In the instance shown, if the credit score is greater than 600, the workflow engine generates an instant home mortgage offer to the customer (step 88) and displays the offer for the customer's review (step 90). If multiple banks are registered with the system 10, the workflow engine 20 performs the evaluation process for each bank and generates multiple instant offers.

The instant offers are stored by the system 10 indefinitely; however, offers may expire or lapse within a proscribed period of time. For example, one bank may require that all loan offers that have not been accepted by the applicant will expire after 30 days. The amount of time a loan offer remains valid is determined and set by each bank. Thus, multiple loans may be extended to the applicant, and over time, some may expire, requiring the applicant to reapply to be reconsidered for the expired loan offer.

If the applicant accepts one of the offers by selecting the offer and clicking on an "accept" button, the workflow engine 20 transmits the acceptance to the bank so that a loan officer may become involved in contacting the loan applicant and arranging the paperwork and signature documents. The workflow engine 20 displays a bank confirmation notice to the applicant (step 92). If the applicant rejects an offer or accepts another offer, the remaining loan offerings are rejected, and the banks are notified accordingly (step 94).

Multiple instant offers may be generated within seconds of the submitted application, depending on the applicant's credit score. The entire credit evaluation process can be completed and a decision is rendered by the workflow engine 20 without human intervention. However, all on-line loan offers are conditional, the instant offer being conditioned upon proof or documentation of the applicant's identity. Thus, a human becomes involved in the loan application process only after an offer has been extended (step 88) and accepted (step 92), thereby reducing the workload of individual loan specialists.

Returning to the credit evaluation process (step 86), if the applicant's credit score is less than or equal to 600, the workflow engine 20 transmits the application to a loan officer at the bank for further review (step 96). If the applicant does not qualify for a loan, the bank officer generates a rejection notice, which is transmitted to the applicant via the workflow engine 20 (step 98). If the applicant does qualify, the bank officer creates a loan offer and the workflow engine 20 transmits the offer (step 100) to the applicant for review (step 90).

Thus, in the event that the applicant does not qualify for an instant offer, the system 10 routes the application to a loan officer to take a second look at the application.

As previously mentioned, offers may expire if not accepted within a proscribed period of time. However, offers may also be made too late (step 102). If an applicant accepts a loan offer (step 92) before an additional offer is made, the additional offer may be made too late (step 102), causing the workflow engine 20 to notify the bank. This feature allows banks to track the influence of decision delays on loss of business, a factor which may be difficult to ascertain in the ordinary course of business.

Figure 7:
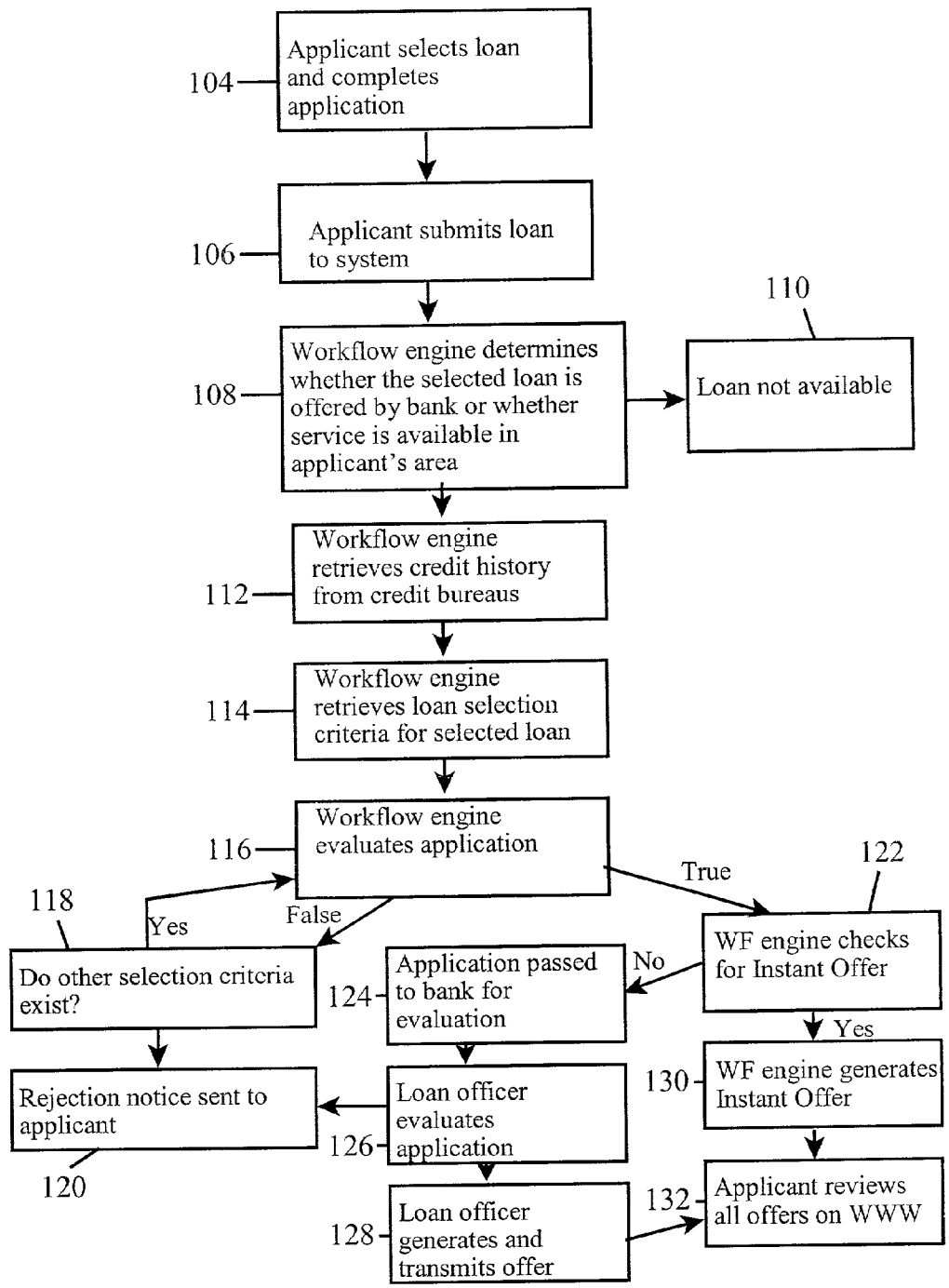
FIG. 7 is a schematic flow diagram of the instant offer loan process of the present invention showing additional details regarding the credit evaluation process.

As shown in FIG. 7, the "Evaluate Credit" task is comprised of multiple functions or operations. The settings for each portion of the calculation may be modified by each bank using the workflow designer 24. Furthermore, in the preferred embodiment, the order of the functions performed in each task may be rearranged by each bank to conform with internal banking policies and procedures, using the workflow designer.

First, the loan applicant selects the loan for which they wish to apply (step 104). The loan is defined within the system 10 by category, subcategory and loan type. The loan applicant submits the loan to the workflow engine 20 (step 106). The workflow engine 20 determines whether the loan request is handled by the particular financial institution (step 108). If the financial institution does not handle that particular loan type, a notice is sent to the applicant (step 110). Similarly, if the financial institution cannot service a loan in the applicant's zip code, a notice is sent to the applicant (step 110).

If the financial institution does service the selected loan type within the applicant's service area, the workflow engine 20 retrieves the applicant's credit record from one or all of the credit bureaus electronically (step 112). The workflow engine 20 then retrieves the selection criteria for that loan type for one of the participating lenders (step 114).

The selection criteria is evaluated against the loan application detail and the retrieved credit information (step 116). The result of the evaluation is either a true or false for each loan package. Any criteria that evaluates "true" may have an instant offer associated with it. For example, an applicant with a credit score of 700 may trigger an instant offer at 6.5% APR for a 30 year fixed mortgage. The same applicant may trigger an instant offer at a lower rate because of a combination of annual income, debt-to-income ratio, and credit score in combination.

Each bank sets the parameters for an instant offer for each loan type entered into the system 10. Thus, using the workflow designer 24, the bank may set up hundreds of loan packages with different combinations of parameters generating instant offers.

If none of the parameters evaluate "true," the workflow engine 20 determines whether another set of selection criteria exists (step 118). If no other selection criteria exist, a rejection notice is sent to the customer (step 120).

If one of the parameters evaluates "true," the workflow engine 20 checks if there is an instant offer associated with that parameter (step 122). If not, the workflow engine 20 notifies the applicant that their loan request has passed initial selection criteria, and that the bank is evaluating their loan request and will notify them within 1 business day (step 124). The bank officer reviews the loan request over the Internet on the system 10 (step 126). If the bank rejects the application, a rejection notice is sent to the applicant (step 120). If the bank accepts the loan, the loan officer generates an offer and transmits it through the workflow engine 20 (step 128).

If one of the parameters evaluates "yes" and an instant offer is associated with that parameter, the workflow engine 20 generates an instant offer (step 130) and transmits the offer to the user for display. The loan applicant reviews all loan offers (step 132). The applicant reviews the loan details over the Internet, and can select from a list of offers.

To evaluate the consumer's credit worthiness, the subprocess retrieves a credit evaluation checklist from the database 28 according to the applicant's country (step 114). The process as shown in FIG. 7 assumes the applicant is from the United States, and relies in part on the credit score provided by one or all of the credit bureaus, such as TransUnion, Equifax, Experian and the like.

The credit evaluation process may involve several steps. For example, in the United States, the system uses the financial information provided through the on-line application form to retrieve the consumer's credit history electronically from one of the credit bureaus. Upon accessing the credit history report, the workflow engine 20 uses the credit history to generate a credit score for that particular consumer. Based on the parameters established by the various financial institutions, the workflow engine 20 uses the credit score to retrieve instant loan offers for the consumer. Each bank or financial institution controls the selection criteria used to determine whether the consumer qualifies for an instant offer.

Assuming that the borrower scores high enough to qualify for one or more of the instant offer loans, the system 10 compiles a list of instant offers for that consumer and displays them on a web page for the consumer's review. The consumer can review each of the potential loan offers, including interest rates, amount, and so on, and can either reject the offer or accept the offer. Each loan offer lasts for a period of days or hours before expiring, to allow the consumer to consider the options available. If a consumer wishes to view the offers at a later time, the consumer simply returns to the site and logs in as a registered user, and the workflow engine 20 retrieves and displays the list of credit offers.

While banks in the United States often rely (in part) on credit bureaus for rendering a credit decision for individual consumers, not all countries have such credit reporting services. In the United States, the credit bureaus create a credit score according to an individual's social security number as well as other demographic information. In India, there is no such national identification system that allows for straight-forward identification of an applicant. In India for example, there are no credit bureaus, so banks use different criteria for rendering a credit decision. For example, the banks may use age range, number of dependents, credit card information (such as corporate card, 1 card with no outstanding balance, 2 or more cards with outstanding balance, total number of credit cards, and so on), social status (passport number, voter ID, Ration Card No., Club Membership Name/Number, Phone connection, and so on), and gross income. Each response within the form leads to a raw number as defined by the banks rating for that value. The total sum of the applicant's scores divided by 5 provides an average Personal Index Rating or score.

Moreover, there is no central credit reporting agency at all in some countries to which banks send timely information regarding their customers. Banks are very protective of their customers, and they do not easily share information for fear of losing customers to other banks. The present system 10 not only provides a unique scoring capability, but the system can uniquely identify an individual through an ATL ID number associated with a limited history regarding that individual's loan requests, such as whether a previous request was fulfilled, as well as limited information regarding the applicant's current assets and liabilities.

In addition, some banks may choose to employ similar ratings in addition to a credit bureau score to determine whether to extend an instant offer to the applicant. The workflow designer 24 allows the banks to configure a web-based credit rating process or checklist for weighting any or all of these various factors. The workflow engine 20 is customizable to accommodate different workflows and different loan criteria.

Additionally, banks may require certain documents from a potential borrower. In India, documents of title to land or personal property and other proofs may be required to verify the application data. Thus, the conditional loan offer may be conditioned on such document production.

Using the workflow designer 24, the bank officer assigns weighted averages to each criterion in seven separate indexes. The weighted average form allows for numerical entry up to 100 unique values for each bank. In the preferred embodiment, the weighted averages are presented in a table of seven rows, wherein the sum of the weighted numerical entries equals exactly 100.

The workflow engine 20 uses the application data, the selection criteria, and sometimes the credit bureau score to calculate an Individual Indexed Rating in seven different specifications for each customer or applicant. Each of the seven criteria has its own formula. The seven categories for individual indexed ratings include: debt-to-income ratio, disposable income (monthly), discretionary income (monthly), net worth, existing loans, personal status, and professional status. The weighting for each of the indexed ratings can be adjusted by the bank for each loan type.

When a loan officer from a bank logs onto the bank interface of the system 10, the loan officer can click on a button to view all Work in Progress (WIP) or pending applications. From the WIP screen, the loan officer can retrieve a "loan table" which displays the individual indexed ratings for each pending applicant. The information is for display only and cannot be modified. The loan officer can use these scores to generate additional offers.

Using the workflow designer 24, the bank officer can enter weighted scores relating to discretionary income. For example, the bank officer enters a score of "9" for a percentage range of disposable monthly income between 0% and 25%, and "8" for monthly disposable income between 26% and 35% of gross monthly income. If an applicant's percentage is 28%, his Factor for this rating index is 8. Each percentage and each weighted score can be entered by the loan officer. Thus, the loan officer or bank can adjust parameters within the credit evaluation subprocess to weight heavier on certain factors than on others. The bank may vary these factors from one loan package to the next, such that two loans within the same category may have different selection criteria.

For example, a high risk loan applicant may qualify for a loan at a high interest rate (such as 9 percent), whereas a good credit risk applicant may qualify for 6.5% interest rate, as well as the higher rate. Various factors may be adjusted for each loan package, type, category and so on. Similarly, the other factors may be weighted and adjusted.

In India, the applicant must submit information relating to assets and liabilities, income, current residence, valid credit card number, marital status, and so on. The location of the residence, employment status (professional, engineer, financial, and so on), wage type (such as salaried, hourly, and so on), and credit card number can be used to validate the applicant's identity and credit-worthiness. Each factor may be weighted according to importance, such that employment status, wage type, household income and marital status maybe weighted more heavily than other factors. These factors tend to be better indicators of credit risk than others.

In FIG. 7, the retrieval of a credit bureau score (step 112) may be eliminated and replaced with an evaluation step, wherein the demographic data submitted by the applicant is weighted using the entered parameters described above. Thus, the individual indexed rating is calculated similarly to the above described index, using different data items. For example, a corporate loan in India may require information such as the company type, such as multi-national corporation, Government entity, listed company, blue chip listed company, public sector business, own-your-own-business (audited tax returns), own-your-own-business (un-audited tax returns) private company, and other.

In general, the financial institutions are connected to the system 10 via secure socket layer connections over the Internet 18. A loan officer at the financial institution can review pending applications using a loan director interface. In addition, action items requiring review by a loan officer will be instigated by the workflow engine 20, by adding the item to the officer's task list and by e-mail or other means. The loan officer can then reviews the client's application.

Initially, the workflow engine 20 uses parameters defined by each of the financial institutions to render an instant loan decision. Each financial institution must establish loan types, loan criteria, loan officers, and administrators within the system 10 using the workflow designer 24. The workflow designer 24 provides a Microsoft Windows' based interface for setting up and modifying the workflow checklist.

Figure 8:
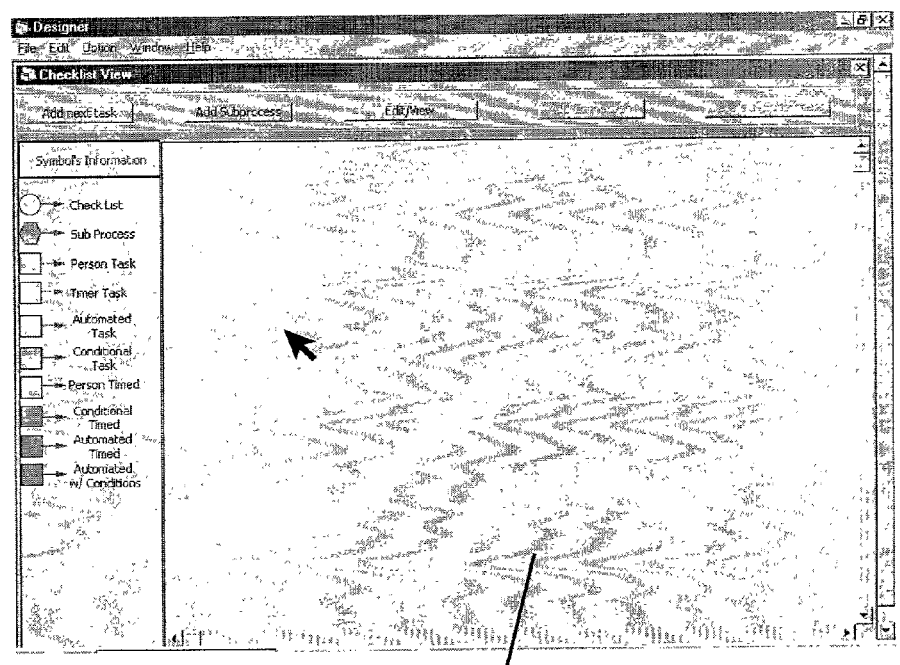
FIG. 8 is a screen shot of the web-based workflow designer view of the system of FIG. 1.

As shown in FIG. 8, the workflow designer 24 divides the screen into a list of symbols 134 and a workspace 136. Each symbol represents a task or action item within a checklist, or a checklist itself. Within the workflow designer 24, a bank administrator can drag an icon from the list of symbols 134 into the workspace 136. The symbols 134 are object-based representations of functions or identifiers within the workflow engine 20. A checklist is used by the workflow engine 20 to perform a task.

The loan workflow designer 24 is an application that allows the user to define checklists and selection criteria for bank lending and deposit processes. The loan workflow designer 24 employs a graphical user interface (GUI) to allow the specification of individual tasks necessary to complete a process within a bank. Each task is an individual piece of work necessary to complete the process. A task may be completed by a person, may be automated, may be time dependent, or conditional. Person-based tasks automated tasks and conditional tasks can also be timed. All tasks may be conditionally started using selection criteria. The system selection criteria uses the loan data data captured during the application phase to make decisions as to whether or not to start the task. All tasks are completed in a sequence defined by the checklists. Rolls, performers, branches, banks, and other units are defined within this loan workflow designer.

Generally, a checklist is created by dragging the checklist symbol into the workspace 136. Subsequent action items, tasks or subprocesses can be dragged into the workspace 136 to create a checklist for use by the workflow engine 20. The tasks are linked by arrows representing the order in which the tasks or subprocesses are to be performed by the workflow engine 20. The workflow designer 24 allows the various symbols to be rearranged after the checklist is created.

Additionally, the workflow designer 24 allows the administrator to modify the names of tasks, adjust parameters, create new loan checklists, loan types, setup bank policies, define users, access work queues, design and produce reports, graphs and productivity statements, and create new cross-selling processes. By clicking on task objects or creating new task objects or subprocesses, the workflow designer 24 provides an object-based interface for dynamic modification of the workflow process, allowing easy accommodation of process and criteria modifications.

Figure 9A:
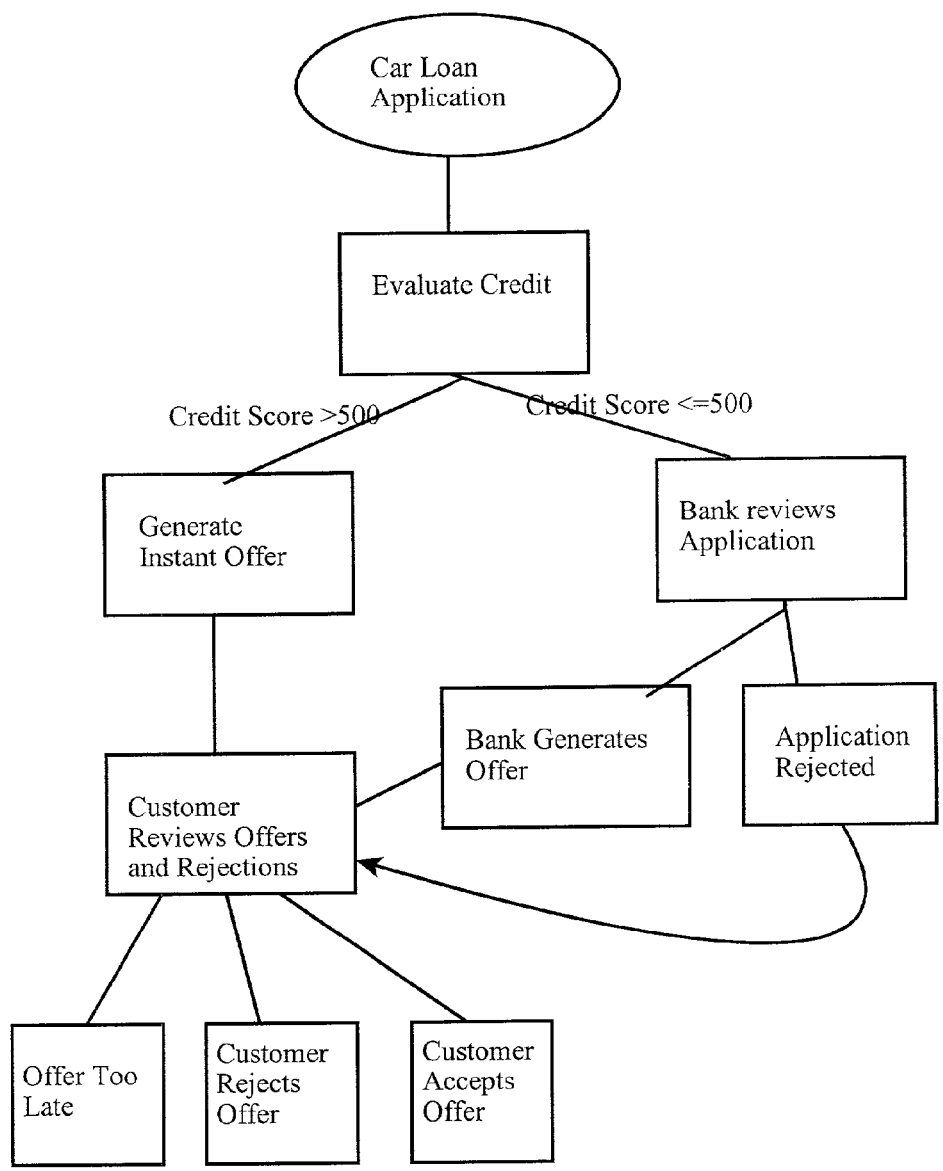
FIG. 9A is a workflow process created using the workflow designer of FIG. 8.
Figure 9B:
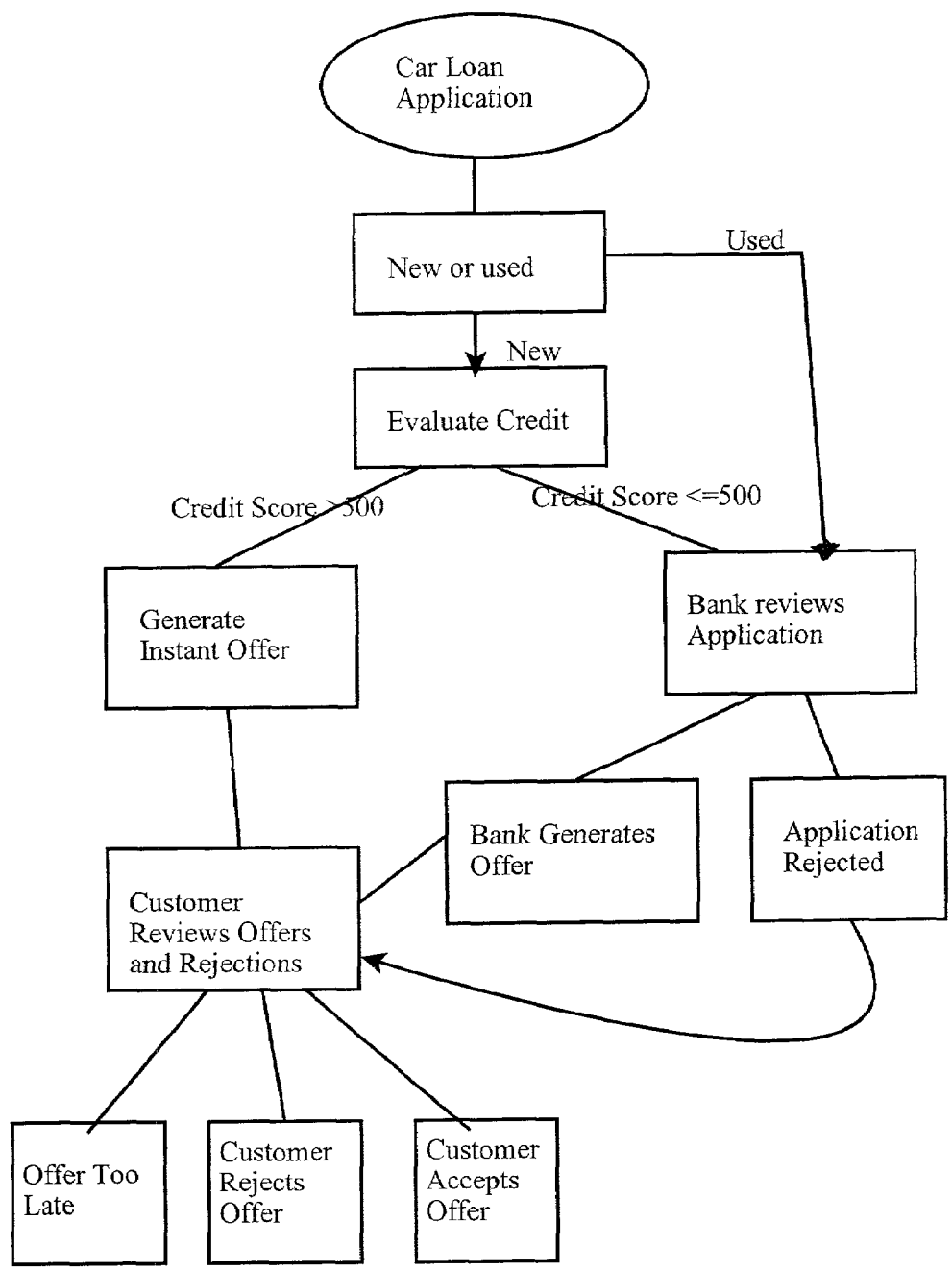
FIG. 9B is modified version of the workflow process of FIG. 9A.

As shown in FIG. 9A, a workflow checklist created using the workflow designer 24. FIG. 9B illustrates the workflow checklist of FIG. 9A with the items order slightly modified. Specifically, a new evaluation is added between the application and the credit evaluation to flag whether the application is for a new or a used vehicle. The change is effected by simply dragging new symbols 134 into the workspace 136 or by dragging existing items around in the workspace 136. This web-enabled workflow designer 24 provides a dynamic interface for banks to customize their workflow processes, and to automate the loan decision process.

The workflow designer 24 is used by the administrator to establish user rights and permissions. The officers and administrators have different access rights within the workflow process, such that each of a particular financial institution's users may be abstractly defined as a user belonging to one of the defined groups. Generally, only an administrator can define user privileges and loan categories. Other permissions and variations on access privileges maybe added and controlled by the financial institution. Other user levels may be added and configured to provide varying levels of user access.

Each financial institution configures each loan type, such as mortgages, auto loans, and the like, with their own qualifying criteria, which the workflow engine 20 uses to evaluate loan applications. The financial institution controls the criteria and loan types offered on its behalf. The workflow engine 20 uses the loan criteria to evaluate automatically the loan application provided by the applicant.

Generally, an instant loan offer is a conditional loan offer from a financial institution to a qualified applicant. The loan offer is conditioned upon the accuracy of the information submitted by the applicant. Provided the applicant can prove his or her identify and that the additional information required by the lending institution is accurate, the loan offer is binding on the financial institution upon acceptance by the applicant.

Applicants, who do not qualify for an "instant offer" based on parameters set may still qualify for a loan offer under other criteria. Initially rejected applications, which meet some but not all of the criteria defined by the lender, may proceed to a manual application review by a loan officer at the particular lending institution. The workflow engine 20 directs such applications automatically to financial institutions for a secondary evaluation of the application, according to the predefined workflow process.

Within the automated loan system 10, financial institutions compete for borrowers. Borrows may apply for the loan at an Internet web site, receive multiple offers from different lending institutions, choose the best offer, and accept the offer on-line. For qualified borrowers, the entire process from application to acceptance may be completed on-line within just a few seconds.

A client can view the list of offers, check the status of an application and so on. The client reviews the list of offers, clicks on individual offers within the list to see the offer in detail, and accepts an individual offer by clicking a button in the web browser. As previously discussed, once the client has accepted the offer, the workflow engine 20 communicates the acceptance to the selected lending institution electronically. A loan officer at the lending institution can then contact the borrower to arrange for document signatures, notary or witness signatures, documentary requirements and so on.

The loan workflow engine provides 20 an extensive workflow automation in the back end processing, thereby insuring an integrated approach to loan and deposit processing from origination to closing. Together, the workflow engine 20 speeds up the delivery process, improves data consistency, consolidates processes, increases productivity, and reduces time to process a loan or provide deposit services. Specifically, data entry is performed by the applicant, thereby minimizing data entry errors because the consumer is more likely to enter his or her personal information correctly. Additionally, the forms and processes are entered in advance by the institution, instead of being created each time by the loan officer. Finally, the loan officers are not involved in the loan process until the initial screening has been performed by the workflow engine 20, thereby maximizing the loan officer's productivity.

The workflow engine 20 has built-in messaging, which allows for easy exchange of data between home offices, branches, point of sale originators, financial institutions, and the customer. In addition, the built-in messaging component facilitates customer/financial institution communication with third party providers. In addition, this component provides tools for management control including online monitoring capabilities, statistical reports, graphical analysis and workload tracking.

The loan workflow designer 24 provides a graphical interface for establishing workflow processes, which can be used to accept and evaluate loan applications, manage underwriting and closing, and perform various other bank lending tasks, which parallel existing banking policies and guidelines for lending and deposit processes. In addition, the financial institutions may use the loan workflow designer to establish work queues that act as dynamic "to do" lists that provide the financial institution staff with an online, automatic, task management tool. Loan officers can also access work queues to check work loads and reassign tasks, store and track unique data, define and produce unique reports graphs and productivity statements, and provide vital cross selling information.

Participants in the system are defined abstractly within the system, communicate via the Internet web interface. Specialize software components allowing lending institutions to specify data content of online credit/loan applications can be entered over the Internet as well.

Consumers and customers are kept in contact with lending institutions via a customized messaging and data routing system. Financial institutions can compose custom letters which are automatically sent to customers based on certain workflow events. In addition, customers can access the system 10 from anywhere in the world using Internet browser. Finally, the entire loan process may be completed over the Internet, including automatic disbursement of funds to the customer, and all application, authentication, processing and acceptance can be performed automatically online within a few seconds.

The system 10 maintains an automatic dialing connection to credit bureaus to obtain and process data based on the credit reports for making internal credit decisions. The system 10 can be utilized by multiple branches of a financial institution over an unlimited geographic area using the Internet 18. In addition, multiple financial institutions can compete for consumers through the system 10 at the same time. The system 10 is wireless-ready, offering consumers both wireless application protocol (WAP) services. Furthermore, document verification can be completed via wireless connection.

As previously discussed, the online automatic loan system permits access by wireless technologies. The software components described above have built in wireless access proto call, which provides access capabilities over WAP and WML enabled hand held devices such as web enabled cell phones and personal digital assistant (PDA) devices. These capabilities have been built into the consumer side and loan fulfillment components of the software.

The online automated loan system can be implemented in one of two ways. In one embodiment, multiple financial institutions compete for consumers via one system. In this embodiment, the workflow designer establishes a workflow that streamlines processes for receiving applications and processing the applications automatically. Each of the financial institutions in this system share the same workflow design. However, each financial institution can customize the specific selection criteria values within each step of the workflow design process. In the preferred embodiment, each bank customizes its own workflow processes and task parameters.

Thus, each bank may insert loan officer or person-based tasks into the workflow process, so that when that task is reached by the workflow engine 20, the workflow engine 20 generates a message to a loan officer to become involved. Typically, such a message is generated upon acceptance of an instant offer, so that the loan officer can prepare documentation and verify application data.

The workflow engine 20 can both balance workloads to bank officers and route loan closings to branch offices that are closer to the borrower. Though bank branches may compete with each other for aborrower's business, the borrower may still interact with a local branch to service the loan (even if the offer accepted is from a different bank branch).

In addition to loans, credit cards, credit lines, and various financial instruments may also be processed by the workflow engine. Each bank enters its own financial products into the system 10, including appropriate selection criteria. Thus, each bank determines the types of products marketed through the system 10.

If the consumer's credit score falls below established parameters, the workflow engine 20 may still facilitate processing of the loan application. By forwarding the loan application electronically to participating lending institution, the workflow engine 20 permits the financial institutions to apply other loan criteria and decision-making to generate an offer. In the event that the financial institution chooses to issue an offer, the loan officer generates an electronic offer or message and transmits the offer to the customer.

Offer details maybe renegotiated online by clicking a link to communicate directly with the financial institution. The loan applicant then selects the best offer. The workflow engine 20 includes a web-based messaging system for handling instant offers and responses, and for channeling the various communications to the appropriate recipient.

Although the present invention has been described with reference to preferred embodiments, workers skilled in the art will recognize that changes may be made in form and detail without departing from the spirit and scope of the invention.

The invention claimed is:

1. An automated loan system, the system comprising:
    a computer processor for processing a collection of software components;
    a computer-readable memory for storing the collection of software components; and
    the collection of software components stored in computer-readable memory on a single platform, the collection comprising:
        a software component for lenders to establish configurable workflow checklists in real-time in which a plurality of differentiated tasks are set up and are made available for a plurality of loan types;
        wherein each workflow task can avail of a plurality of existing or new underlying business parameter objects that can be embedded for workflow task automation;
        a data dictionary unique to the loan type associated with each workflow, wherein each workflow for any loan type is driven by the associated data dictionary, the software component for lenders having the ability to use, handle and manage the data-dictionary and to generate entry conditions and rules;
        a database for the software components allowing the lenders to establish entry conditions for any of the plurality of differentiated tasks, allowing the lenders to modify and add entry conditions, business parameter objects, rules, and also containing loan offerings data specific to each of a plurality of lenders;
    wherein the collection of software components provides the lenders the flexibility to dynamically re-order and rearrange workflow checklists without restarting an application server or reinstalling the collection of software components to drive lending rules for plurality of differentiated loan types in real-time, without any dependence on costly and time consuming programming changes;
        an integrated web application interface providing a loan-type specific credit application form for a consumer to complete, the website interface providing a field for the consumer to select a category of loan offerings from a plurality of loan offering categories;
        a network-accessible lender partner software component linked as part of the business parameter objects for loan offerings for products offered by lender partners; and
        a workflow engine for evaluating a completed credit application automatically using the loan process checklist and for generating an instant loan offer for qualified credit applications.

2. The automated loan system of claim 1, wherein the instant loan offer is conditioned on verification of information contained in the completed credit application against a reference data source.

3. The automated loan system of claim 1, further comprising:
    a bank database containing a plurality of records, each record being associated with a single financial institution, each record representing a checklist for a loan category and type, each task in each checklist containing at least one selection criterion.

4. The automated loan system of claim 1, wherein one or more of the plurality of records contains an instant offer associated with the at least one selection criterion of at least one of the plurality of tasks.

5. The automated loan system of claim 1, wherein the lender interface allows an officer of the lender to access rejected credit applications.

6. The automated loan system of claim 1, wherein each task has at least one associated selection criteria determined by a lender.

7. A computer implemented method for providing multiple instant Internet-based loan offers, the method comprising:
    creating a plurality of differentiated and configurable tasks stored in computer-readable memory and available to lenders for a plurality of loan types;

creating a plurality of business parameter objects stored in computer-readable memory that can be embedded with any of the plurality of differentiated and configurable tasks by lenders for establishing a desired extent of automation of a chosen differentiated and configurable task;

dynamically creating rules by computer for any plurality of the loan types without any intervention or modification to software programming;

creating a rules database stored in computer-readable memory that enables lenders to establish entry conditions for any of the plurality of differentiated tasks;

configuring workflow parameters associated with a checklist stored in computer-readable memory for each loan offered, wherein the checklist includes a selected number of the plurality of differentiated tasks as well as entry conditions that are associated with each of the differentiated and configurable tasks, and wherein the checklist associates business parameter objects with each of the selected number of the plurality of differentiated and configurable tasks for performing desired functionality in an order as established as part lender-specific workflow process automation;

storing the workflow parameters in a database that resides in a computer-readable storage medium;

providing a website interface for Internet-based credit applications by a consumer wherein the website interface is accessible with a computer;

receiving a completed Internet-based credit application;

parsing the completed Internet-based credit application to determine a loan type from a plurality of available loan offering categories;

retrieving the checklist and associated workflow parameters from the database;

evaluating the completed Interact-based credit application using the checklist and associated workflow parameters, the evaluation process for detecting qualified credit applications, wherein the completed Internet-based credit application is evaluated by performing the differentiated and configurable tasks for which the entry conditions are satisfied as a function of data contained in the completed Internet-based credit application;

generating an instant loan offer from a lender for qualified credit applications; and providing real-time information updates to all parties associated in the workflow based on the defined business parameter objects selected for the checklist.

8. The method according to claim 7, wherein evaluating the completed Internet-based credit application comprises:

retrieving a credit score associated with the consumer from a credit bureau; and evaluating the retrieved credit score against the associated workflow parameters.

9. The method according to claim 7, wherein evaluating the completed Internet-based credit application comprises:

weighting information provided in the completed Internet-based credit application according to an index created by a lender.

10. The method according to claim 9, the method further comprising:

generating an average weighted score; and processing the average weighted score programmatically against the workflow checklist and associated selection criteria.

11. The method according to claim 7, the method further comprising:

displaying the instant offer on a secure web page for the consumer.

12. A system for programmatically rendering a loan decision, the system comprising:

a computer processor for processing a collection of software components;

a computer-readable memory for storing the collection of software components; and a dynamic data dictionary component stored in computer-readable memory with foundation designed to enable generation of application-specific lending workflows in real-time, and allowing lenders to add additional data dictionary fields for any workflow application to create an application-specific data dictionary without any programming effort;

a workflow designer operable via at least one computer processor for lenders to dynamically set up configurable workflows comprising differentiated tasks made available for a plurality of loan types based on the application-specific data-dictionary and to embed a plurality of business parameter objects that can be linked with any of the plurality of differentiated tasks within a given workflow, wherein the differentiated tasks can each be a conditional task, an automated task, an automated timed task, a person-based task, or a person-timed based task, and wherein the workflow designer provides flexibility for the lenders to dynamically modify deployed workflows as part of business planning and process optimization including adding or deleting a differentiated task for a workflow for any loan type and for redefining the degree of automation for each task by embedding new or existing business parameter objects in real-time and to dynamically modify loan selection criteria;

a rules database stored in computer-readable memory dynamically managed for establishing entry conditions for any of the plurality of differentiated tasks; and a workflow engine operable via at least one computer processor for processing loan applications by dynamically identifying the appropriate checklist applicable to the loan type and processing the differentiated tasks of the checklist in the order defined by the workflow for which the associated entry conditions are satisfied and for generating an instant loan decision, the workflow engine capable of transmitting the instant loan decision to a consumer securely in real-time, the workflow engine capable of brokering communications between the consumer and a lender associated with the instant loan decision, the workflow engine further comprising a messaging system for routing communications between the consumer, the lender, and all partners associated with the loan decision, the messaging system providing a digital record of an instant loan offer, and acceptance of the instant loan offer, and a communication record associated with offer acceptance.

13. The system of claim 12, the system further comprising: means for verifying a loan application according to a digital signature associated with the consumer.

14. The system according to claim 12, wherein the selection criteria include a weighted average of information contained in the loan application of the consumer, the information including gross income and outstanding debt.

* * * * *

UNITED STATES PATENT AND TRADEMARK OFFICE
CERTIFICATE OF CORRECTION

PATENT NO. : 7,555,459 B2 Page 1 of 1
APPLICATION NO. : 09/970276
DATED : June 30, 2009
INVENTOR(S) : Kuldeep K. Dhar et al.

It is certified that error appears in the above-identified patent and that said Letters Patent is hereby corrected as shown below:

On Title Page, "Related U.S. Application Data"
    delete "60/237,164" insert --60/237,165--

Col. 23, Line 36, delete "Interact", insert --Internet--

Signed and Sealed this
Thirteenth Day of September, 2011

David J. Kappos
*Director of the United States Patent and Trademark Office*